(12) United States Patent
Haupt (10) Patent No.: US 12,028,011 B2
(45) Date of Patent: Jul. 2, 2024

(54) METHOD AND DEVICE FOR DETECTION OF CONDITION OF BRUSHLESS MOTORS AND GENERATORS

(71) Applicant: Brookhaven Science Associates, LLC, Upton, NY (US)

(72) Inventor: Justine Elaine Haupt, Mattituck, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 238 days.

(21) Appl. No.: 17/607,243

(22) PCT Filed: Apr. 29, 2020

(86) PCT No.: PCT/US2020/030438
§ 371 (c)(1),
(2) Date: Oct. 28, 2021

(87) PCT Pub. No.: WO2020/223329
PCT Pub. Date: Nov. 5, 2020

(65) Prior Publication Data
US 2022/0224261 A1    Jul. 14, 2022

Related U.S. Application Data

(60) Provisional application No. 62/896,183, filed on Sep. 5, 2019, provisional application No. 62/840,471, filed on Apr. 30, 2019.

(51) Int. Cl.
*H02P 6/18*    (2016.01)

(52) U.S. Cl.
CPC .......... *H02P 6/183* (2013.01); *H02P 2203/11* (2013.01); *H02P 2207/05* (2013.01)

(58) Field of Classification Search
CPC ... H02P 6/183; H02P 2203/11; H02P 2207/05
(Continued)

(56) References Cited

U.S. PATENT DOCUMENTS 5,917,334 A * 6/1999 Grunewald .......... G01R 31/346
324/765.01
6,396,229 B1 * 5/2002 Sakamoto ............. H02P 6/18
318/723

(Continued)

FOREIGN PATENT DOCUMENTS

EP    2782228    9/2014
EP    2782228 A1    9/2014
(Continued)

*Primary Examiner* — David Luo
(74) *Attorney, Agent, or Firm* — Dorene Price (57) ABSTRACT

A method and device for determining the position of a rotor in a brushless motor is provided. The method generally includes: injecting electrical signals into a stator of the brushless motor; measuring scattering parameters reflected back from the stator, wherein the scattering parameters are influenced by the near-field dynamics impaired by the motor; and comparing the measured scattering parameters to a predetermined data set of scattering parameters for known rotor positions to determine the position of the rotor. The method and device is also suitable for determining a condition of a motor or a generator.

14 Claims, 10 Drawing Sheets

(58) Field of Classification Search
USPC .................. 318/400.33, 400.32, 400.01, 700
See application file for complete search history.

(56) References Cited

U.S. PATENT DOCUMENTS

| | | | |
|---|---|---|---|
| 8,497,655 B2* | 7/2013 | Liu ..................... | H02P 21/0007 |
| | | | 318/705 |
| 9,553,538 B2* | 1/2017 | Krishnamurthy ..... | H02P 25/089 |
| 2018/0226906 A1 | 8/2018 | Chen et al. | |

FOREIGN PATENT DOCUMENTS

| JP | 2002252995 | 9/2002 |
|---|---|---|
| JP | 2002252995 A | 9/2002 |

* cited by examiner

METHOD AND DEVICE FOR DETECTION OF CONDITION OF BRUSHLESS MOTORS AND GENERATORS

CROSS-REFERENCE TO RELATED APPLICATIONS

This application claims the benefit of U.S. Provisional Application Ser. No. 62/840,471, filed on Apr. 30, 2019, and U.S. Provisional Application Ser. No. 62/896,183, filed on Sep. 5, 2019, the specifications of which are incorporated by reference herein in its entirety for all purposes.

STATEMENT OF GOVERNMENT LICENSE RIGHTS

This invention was made with Government support under contract number DESC0012704, awarded by the U.S. Department of Energy. The Government has certain rights in the invention.

BACKGROUND

Commutation of a brushless electric motor generally requires knowledge of the position of the motor's moving parts (the rotor) with respect to the fixed parts (the stator). This position feedback can be obtained either via the explicit addition of position sensing components, or by treating the rotor-stator pair itself as a sensing device. This latter category is broadly encompassed by "sensorless" motor control, and the associated methods generally depend on the ability to measure electromotive force (EMF) back from the motor. That is, sensorless control measures voltage induced by the motion of the rotor relative to the stator, which is calibrated as a proxy for rotor position.

The methods of detecting and analyzing back EMF for the purpose of motor control are varied, and although these techniques have become increasingly nuanced, an inherent limitation exists. For back-EMF detection to be possible, the motor must be in motion, and with sufficient rapidity. Thus, sensorless control is not possible for low speed operation, such as in fine-positioning applications or where a brushless motor serves as an actuator in which the position of the actuator is more relevant than phasing information for motor commutation.

Accordingly, it would be desirable to provide a sensorless method for detecting the rotor position for low-speed operation of a brushless motor. Indeed, commutation can be achieved in an open-loop mode for very low speeds, so a non-back-EMF sensorless method for low-speed operation would be most useful in actuator position sensing or odometry applications, or for redundancy with conventional position encoders or hall-effect sensors in those cases.

SUMMARY

In one aspect of the present invention, a method for determining the position of a rotor in a brushless motor is provided. The method generally includes: injecting electrical signals into a stator of the brushless motor; measuring scattering parameters reflected back from the stator, wherein the scattering parameters are influenced by the near-field dynamics impaired by the motor; and comparing the measured scattering parameters to a predetermined data set of scattering parameters for known rotor positions to determine the position of the rotor.

In a preferred embodiment, the predetermined data set of scattering parameters includes a library of plots of scattering parameters over a predetermined frequency range, wherein the step of comparing the measured scattering parameters includes: generating a plot of the measured scattering parameters over a predetermined frequency range; and matching the generated plot with one of the plots in the library to determine the position of the rotor.

The electrical signals can be injected using a scanning procedure, wherein discrete frequencies are introduced consecutively. Alternatively, a predetermined range of frequencies of the electrical signals are injected simultaneously as noise. The determined position of the rotor can be an absolute position value or an incremental position value.

The predetermined data set of scattering parameters for known rotor positions is preferably generated by a method including: setting the rotor of the motor to a first selected rotational position; injecting electrical signals into the stator of the motor with the rotor in the first selected position; measuring first scattering parameters reflected back from the stator with the rotor in the first selected position; generating a first plot of the measured first scattering parameters over a predetermined frequency range; storing the first plot of the measured first scattering parameters for the first selected rotational position in the predetermined data set; setting the rotor of the motor to a second selected rotational position; injecting electrical signals into the stator of the motor with the rotor in the second selected position; measuring second scattering parameters reflected from the stator with the rotor in the second selected position; generating a second plot of the measured second scattering parameters over a predetermined frequency range for the second selected position; and storing the second plot of the measured second scattering parameters for the second selected rotational position in the predetermined data set.

In another aspect of the present invention, a device for determining the position of a rotor in a brushless motor is provided. The device generally includes: a source electrically connected to a stator of the brushless motor for injecting electrical signals into the stator; and a meter electrically connected to the stator for measuring scattering parameters reflected back from the stator and for comparing the measured scattering parameters to a predetermined data set of scattering parameters for known rotor positions to determine the position of the rotor.

The meter preferably includes a directional coupler electrically connected between the source and the stator of the motor. The meter may also include a digitizer for measuring the scattering parameters and a processor for computing a Fast Fourier Transform (FFT) based on data recorded from the digitizer. The processor preferably includes a neural network for generating the predetermined data set and for interpreting the measured scattering parameters.

Thus, a reflective sensing platform technology is disclosed that conducts "sensorless" position detection of electric brushless motors or generators over the motor's pre-existing power wires. The method works at various motor velocities, including arbitrarily low or zero velocities, and uses an RF measurement method combined with a simple neural network to calculate the angle or velocity of a motor's armature or rotor. The technology has potential for applications beyond position sensing.

In another aspect of the present disclosure condition-monitoring of a motor or generator may be conducted. Condition-monitoring may be done by using inferences about parameters related to a motor's or a generator's condition. As scattering parameter data or other data from a motor or generator may be interpreted by an analysis algorithm (for example, by a neural network) to infer position information about the motor, inferences may be made of parameters and such parameters may relate to a motor's or generator's condition or condition of performance. These parameters may include but are not limited to the thickness of internal winding insulation, the moisture content of internal winding insulation, the magnetic permeability of structural and magnetic components, the presence or evidence of corrosion on structural and magnetic components, or variations in magnet or stator pole spacing(s). Further, an analysis algorithm such as for example neural network analysis could be directed to obtain warning of a motor or generator failure generally without considering or identifying specific performance parameters.

The preferred embodiments of the method and device for detecting rotor position in a motor, according to aspects of the present invention, as well as other objects, features and advantages of this invention, will be apparent from the following detailed description, which is to be read in conjunction with the accompanying drawings. It is to be understood, however, that the drawings are designed as an illustration only and not as a definition of the limits of this disclosure. The scope of the invention will be pointed out in the claims.

DETAILED DESCRIPTION

The basic principle behind the measurement technique according to an aspect of the present invention is the treatment of the stator windings of a brushless motor as an antenna, wherein each possible position of the rotor with respect to the stator represents a unique configuration of the antenna-like system due to the near-field dynamics imparted by the permanent magnets or field windings of the rotor on the stator windings. With this in mind, it is possible to use antenna analysis techniques, like measurement of Voltage Standing Wave Ratio, or equivalently, the reflection coefficient ($S_{11}$ scattering parameter) to calibrate for rotor position. Importantly, this measurement can be conducted whether or not the motor is in motion as it has no dependence on sensing the back EMF.

Figure 1:
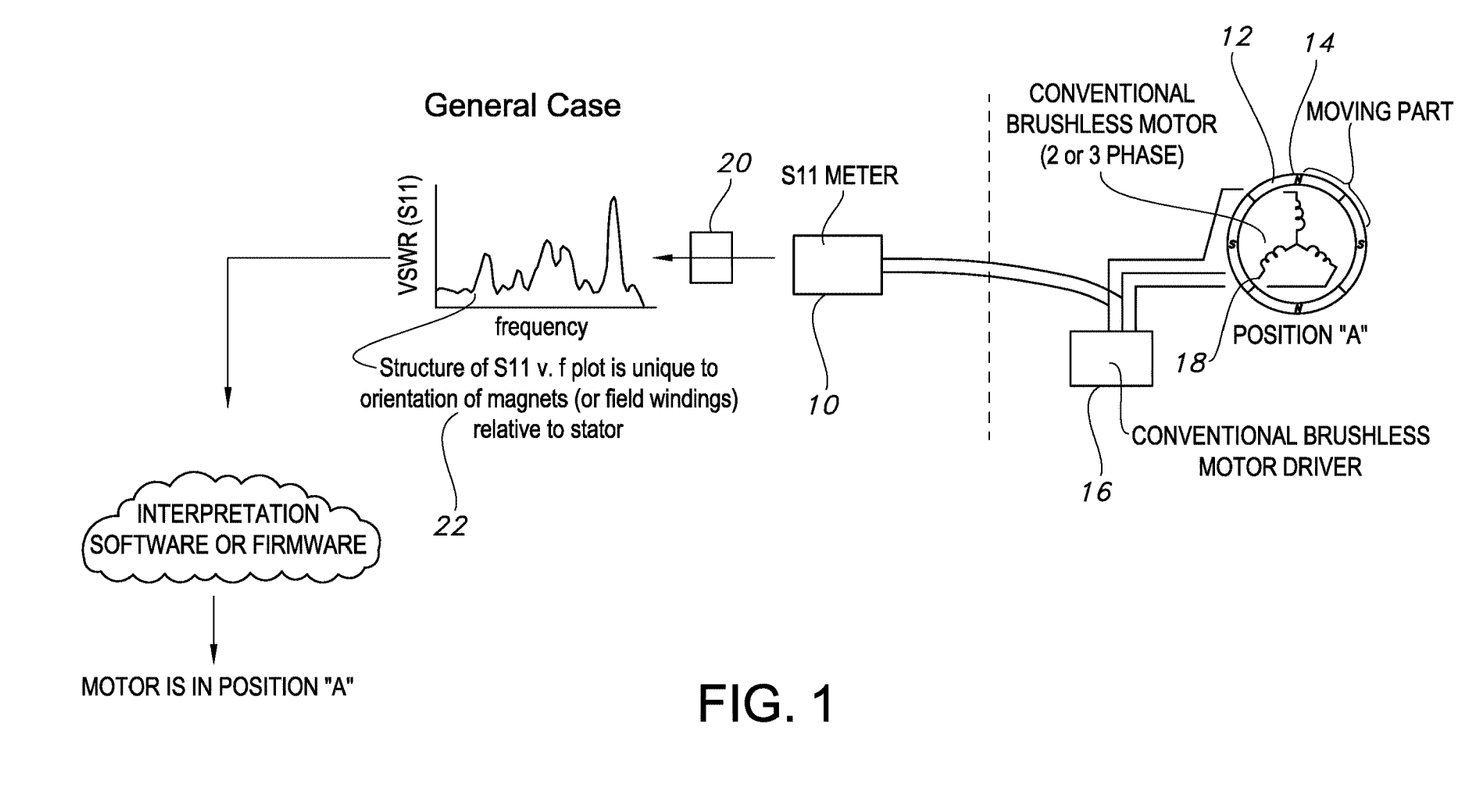
FIG. 1 is a schematic representation of a method for detecting rotor position in a motor according to one aspect of the present invention.

Referring first to FIG. 1, a detection device 10, equivalently called an antenna analyzer according to an aspect of the present invention, is electrically connected to a conventional brushless motor 12. The motor 12 includes a rotor 14 driven by a conventional brushless motor driver 16 so that the rotor rotates around a stationary stator coil winding 18. A typical brushless motor has permanent magnets which rotate around a fixed armature, eliminating problems associated with connecting current to the moving armature. An electronic controller continually switches the phase to the windings to keep the motor turning. The controller performs similar timed power distribution by using a solid-state circuit.

The detection device 10 is connected to the motor 12 and driver 16 in such a way as to introduce electrical signals into one or more coil windings of the stator 18 and to measure the scattering pattern $S_{11}$ of the power reflected back from the stator over a predetermined frequency range. Using known antenna analysis techniques, the electrical signals injected into the stator 18 are typically sine waves having a frequency between 1 mHz and 3 gHz. The signals may be introduced using a scanning procedure, wherein discrete frequencies are introduced consecutively. Alternatively, a range of frequencies may be introduced all at once in the form of "white noise."

The detection device 10 is further provided with additional hardware and software 20 to generate a plot 22 of the reflected power in the form of $S_{11}$ values over the predetermined frequency range and to further interpret the $S_{11}$ plot as a motor position. The interpretation of the $S_{11}$ plot as a motor position is carried out by comparing the measured plot of $S_{11}$ values over the predetermined frequency range to a known data set of $S_{11}$ value plots determined for each of a range of angular rotor positions. In other words, a predetermined library of $S_{11}$ value plots for each position of the magnets in the rotor is stored in a software database, and this library is accessed for comparing a measured $S_{11}$ values to determine the rotor position at any given time.

While FIG. 1 shows an "$S_{11}$ meter" 10 with separate hardware/software 20, it is conceivable that the present invention can take the form of a general device, which both measures $S_{11}$ and produces the needed plot 22. In commercial $S_{11}$ meters, the functions of the measurement circuit and plotting are not necessarily separated. For example, a conventional analog network analyzer has an oscilloscope-like CRT display that, when combined with a tracking signal generator or a noise source, can be used as an $S_{11}$ meter.

In one possible implementation of the present invention, the position information may be used as part of an otherwise conventional brushless motor controller to trigger the commutation sequence. Although the present invention is most suitable for low speed or zero speed operation, it is conceivable for the detection device 10 to use the described position detection method to trigger the correct commutation sequence depending on the detected position.

With conventional brushless motors, an electronic sensor detects the angle of the rotor, and controls semiconductor switches such as transistors which switch current through the windings, either reversing the direction of the current, or in some motors turning it off, at the correct time so the electromagnets create a torque in one direction. The method according to this possible implementation of the present invention may eliminate the need for such sensors.

Figure 2:
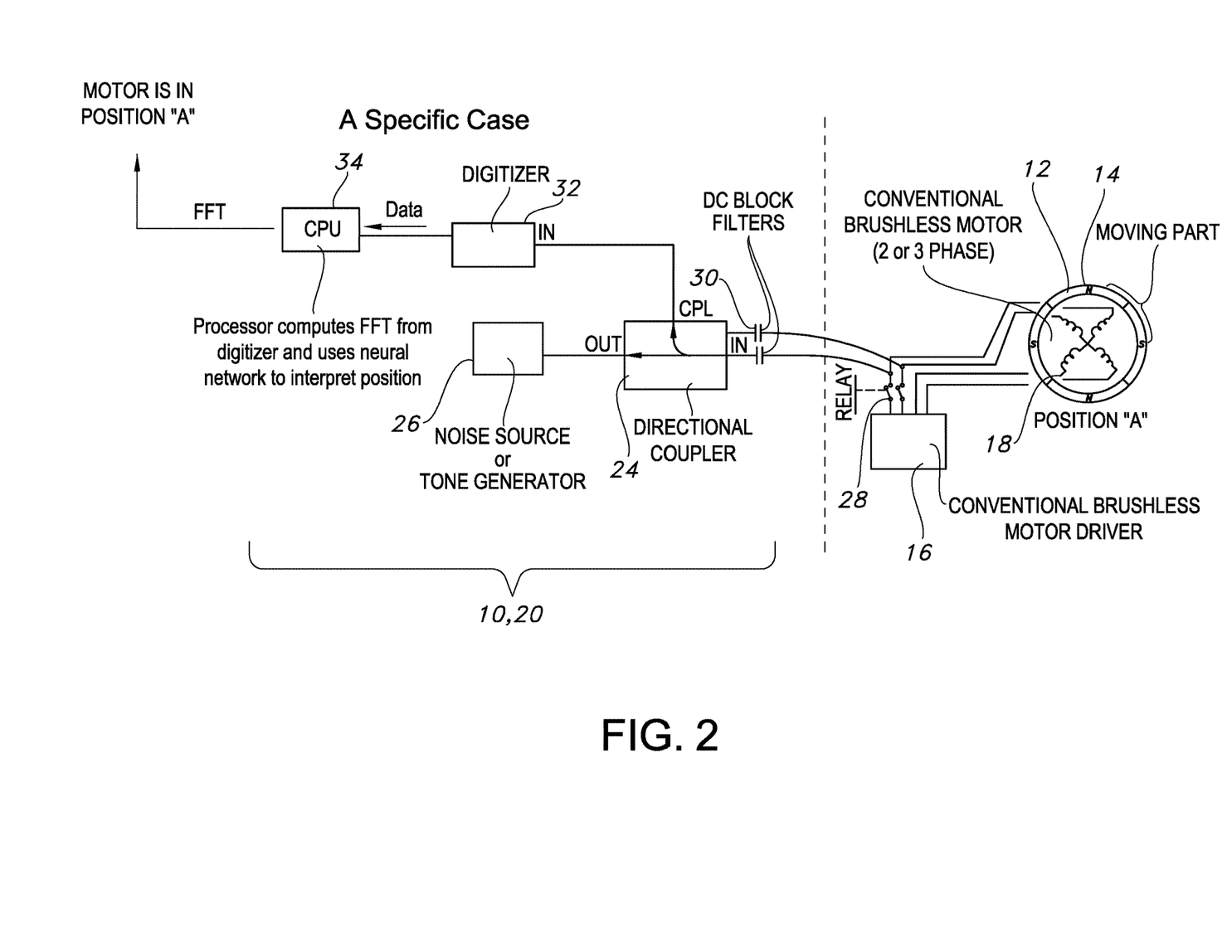
FIG. 2 is a schematic representation of an exemplary embodiment of a detailed method for detecting rotor position in a motor according to another aspect of the present invention.

FIG. 2 shows a more specific embodiment of the present invention, wherein the detection device 10 with associated hardware/software 20 of FIG. 1 has been replaced by an exemplary arrangement of electrical components. Here, the detection device 10 includes a directional coupler 24, which is disconnected from the motor controller via a relay 28. A noise source or tone generator 26 is provided for injecting scanned electrical signals or noise into one of the de-energized stator phases of the motor 12. DC block filters (capacitors) 30 are preferably placed in series with the $S_{11}$ measurement circuit to protect the circuit from the back-EMF voltage from the motor 18.

The device 10 with additional hardware/software 20, according to the alternative embodiment shown in FIG. 2, includes a digitizer 32 connected to an output of the directional coupler 24 and a CPU 34 connected to an output of the digitizer. The processor 34 computes a Fast Fourier Transform (FFT) from the signals received from the digitizer and uses a neural network to interpret position data based on the received $S_{11}$ data. The neural network can be used first in a learning step to generate a data set of $S_{11}$ plots for a range of known rotor positions. The neural network can be subsequently utilized to match a measured $S_{11}$ plot to one of the plots in the data set to determine the rotor position.

Thus, as mentioned above, the components 24, 26, 30, and 32 shown in FIG. 2 are the counterparts to components 10 and 20 shown in FIG. 1. The devices 24, 26, 30 and 32 of FIG. 2 are all equally involved in the measurement of the $S_{11}$ plot, and are one possible specific embodiment for the components 10 and 20 of FIG. 1.

Figure 3:
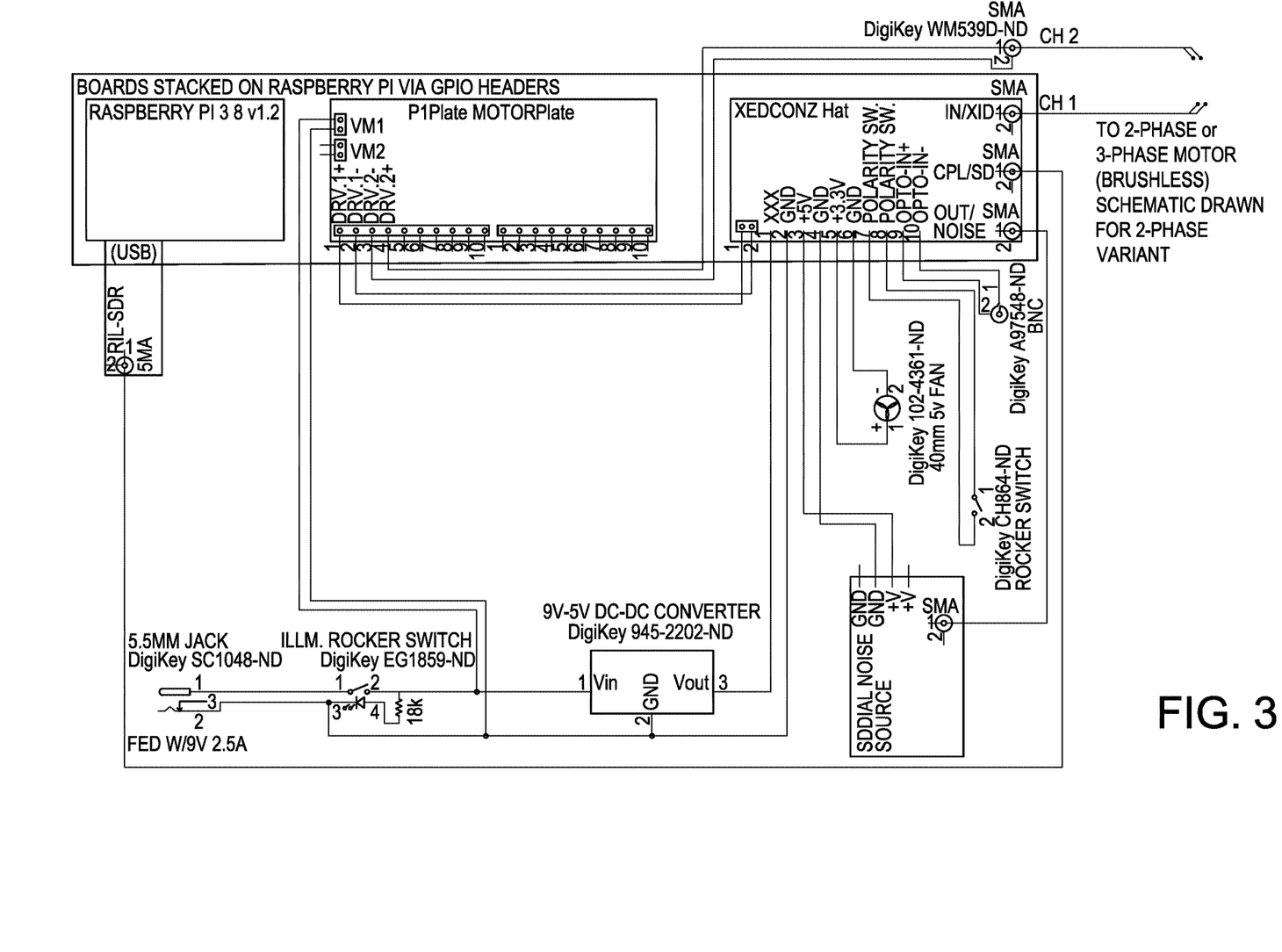
FIG. 3 is an electrical circuit diagram of device for detecting rotor position in a motor according to one aspect of the present invention.
Figure 4:
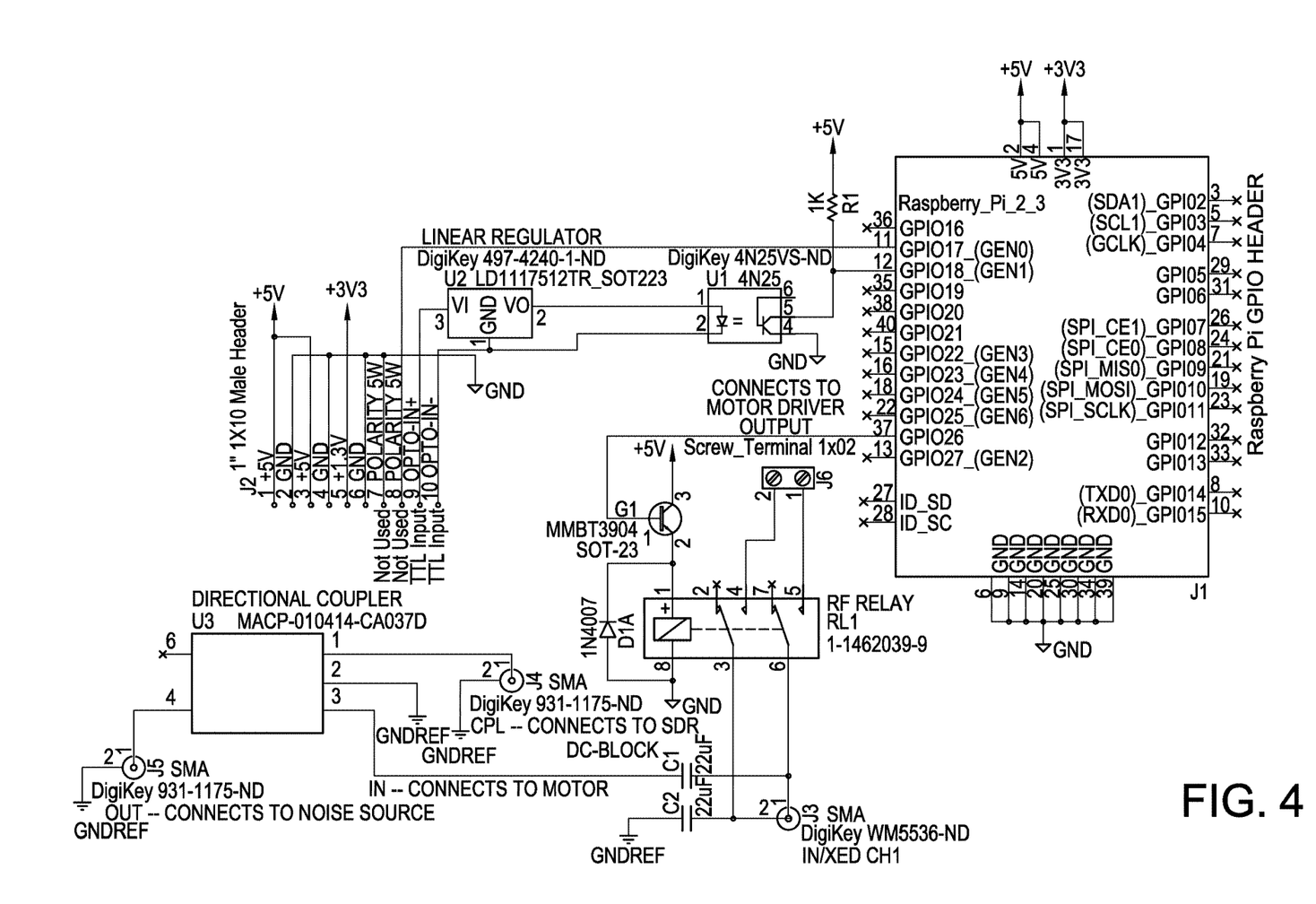
FIG. 4 is a detailed electrical circuit diagram of the block labeled "XEDCON2 HAT" in FIG. 3.

FIGS. 3 and 4 show exemplary circuit diagrams of a detection device 10 and additional hardware 20 according to the present invention. FIG. 3 is an electrical schematic of a possible version of a device, according to an aspect of the present invention, including a second-generation controller box XED. FIG. 4 is an electrical schematic of the XED-CON2 Hat board, which is referenced as a hierarchical sheet in FIG. 3. In the embodiment shown in FIG. 4, the directional coupler 24 of FIG. 2 is built into the XEDCON2 Hat board.

Figure 5:
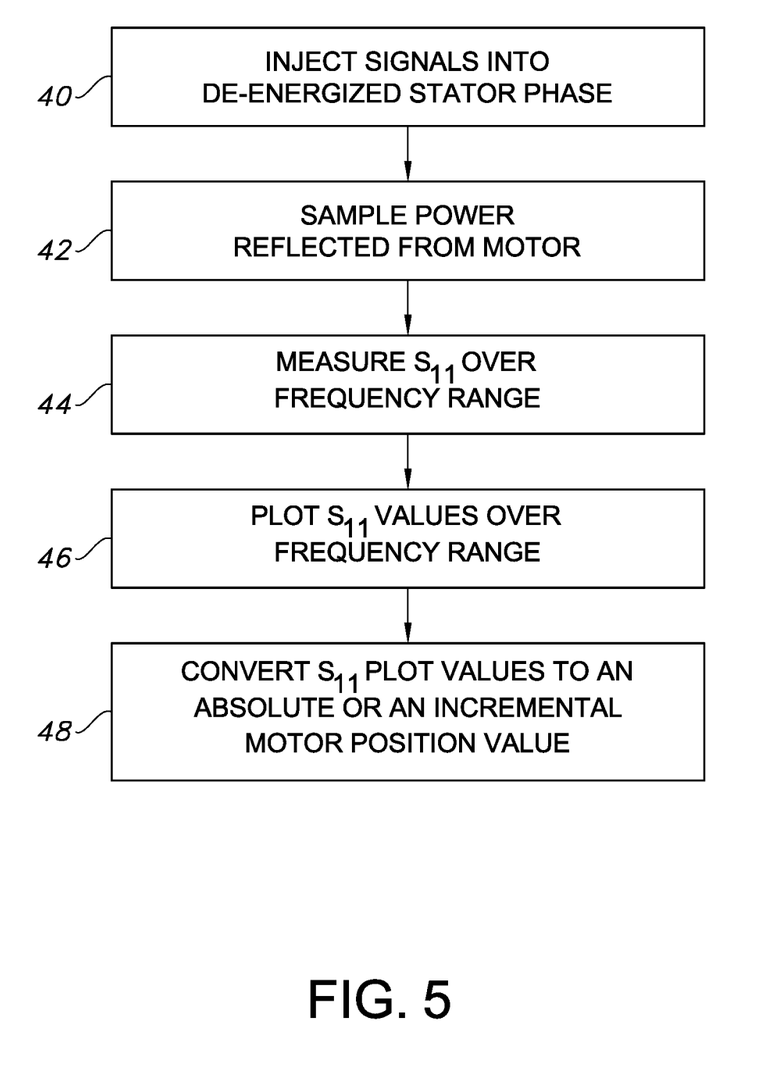
FIG. 5 is a flow chart showing the steps for detecting rotor position in a motor according to one aspect of the present invention.

FIG. 5 is a high level flow chart showing the general steps for detecting rotor position in a motor according to one aspect of the present invention using components, for example, as shown in FIG. 1. In a first step 40, electrical signals having a predetermined range of frequencies are injected into one of the de-energized stator phases of a motor. The motor can be any motor, such as an axial flux motor, which is used as a direct-drive actuator. In step 42, power reflected back from the stator oils of the motor is sampled, and in step 44, scattering parameters $S_{11}$ are measured over the selected frequency range, based on the power samples. In step 46, the $S_{11}$ values are then plotted over the selected frequent range. Finally, the $S_{11}$ plot is then converted to a motor position value in step 48 by comparing the measured and plotted $S_{11}$ values with a predetermined data set of $S_{11}$ plots for known rotor positions.

As mentioned above, the library of $S_{11}$ plots for known rotor positions of an individual motor may first be generated in an initial learning process, wherein the method steps 40, 42, 44, 46 described above are carried out for each of a number of select rotor positions and the plot for each rotor position is stored in the data base. This learning process is illustrated in the flow chart of FIG. 6.

Figure 6:
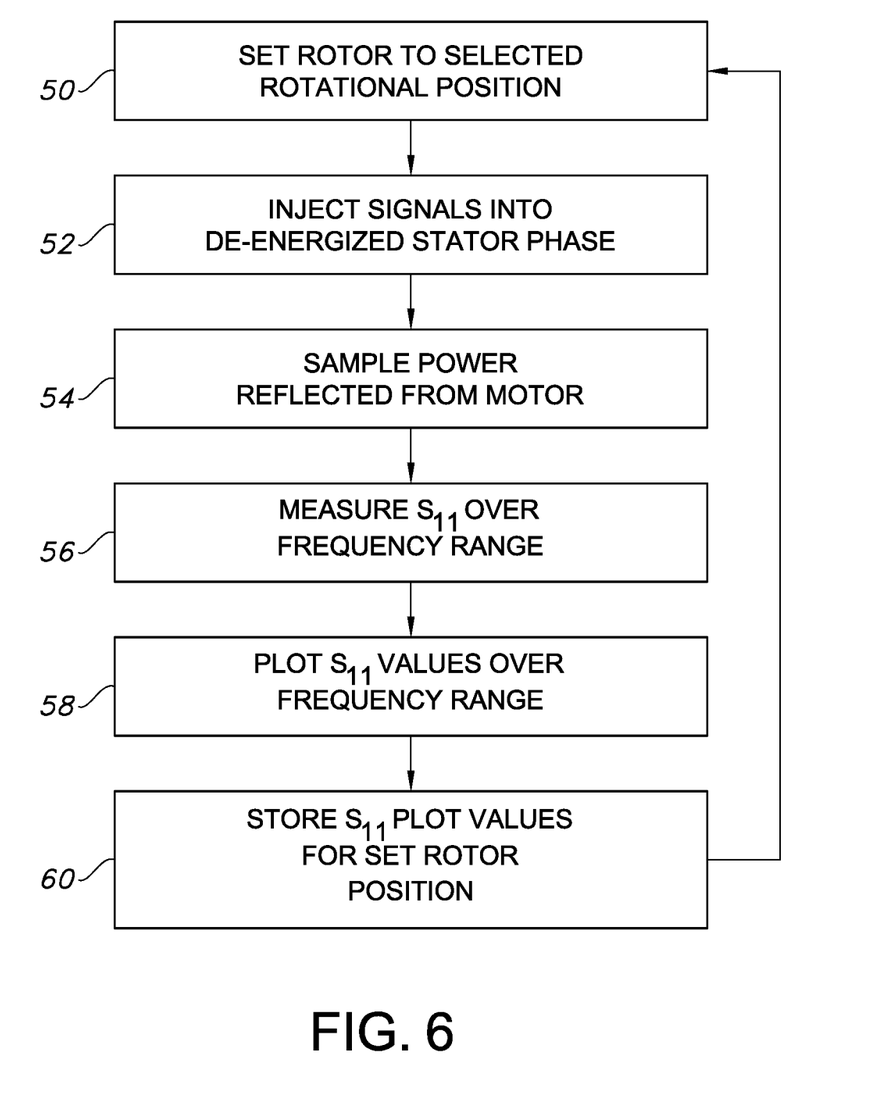
FIG. 6 is a flow chart showing the steps for detecting rotor position in a motor according to another aspect of the present invention.

Thus, as shown in FIG. 6, the rotor is first rotated to a select position in step 50. Electrical signals having a predetermined range of frequencies are injected into one of the de-energized stator phases of the motor in step 52. In step 54, power reflected back from the stator coils of the motor is sampled, and in steps 56 and 58, the scattering parameters $S_{11}$ are plotted over the selected frequent range. In step 60, the $S_{11}$ plot for the selected rotor position is stored in a database and the process is repeated, wherein the rotor is rotated into a new rotational position in step 50. When $S_{11}$ plots for all desired rotor positions are stored, the learning process ends.

It is, however, also conceivable that a library of $S_{11}$ plots may be common for all motors of a given model so that an initial learning step for each individual motor of the given model is not necessary. In this case, a pre-set rotor position database can be consulted.

Figure 7:
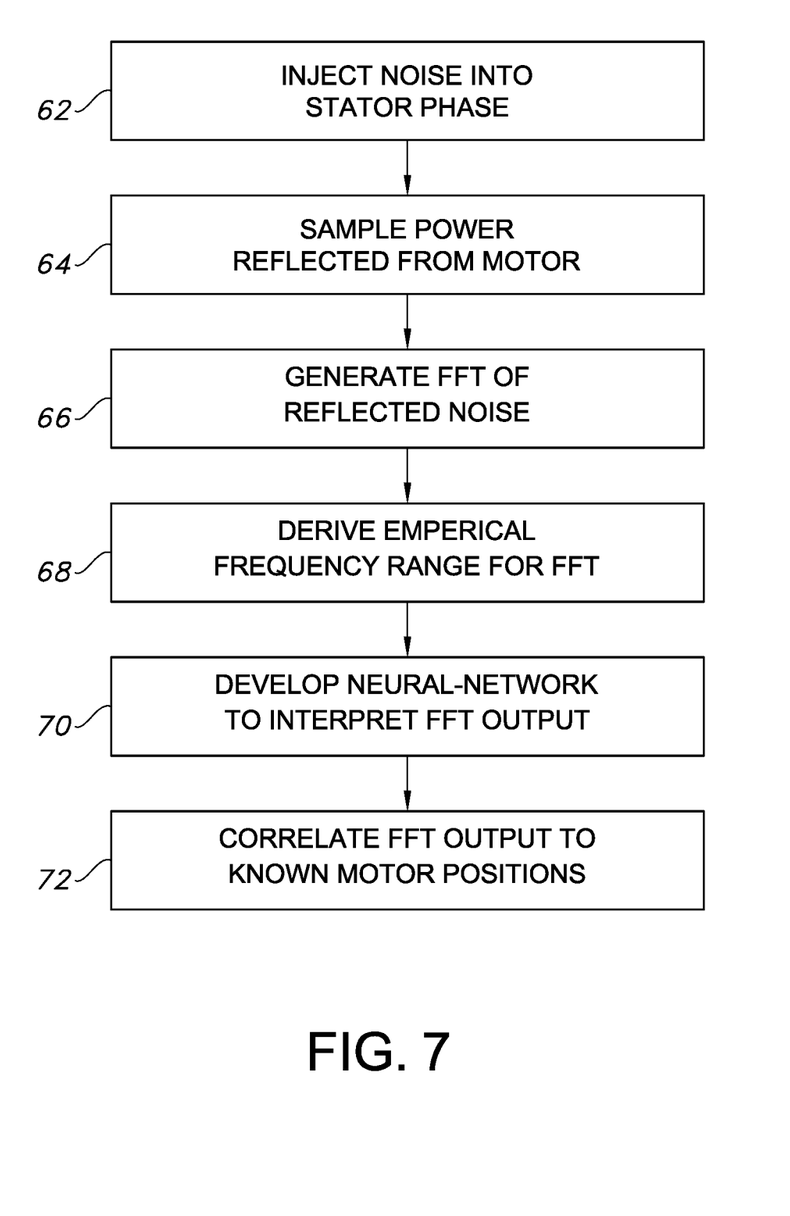
FIG. 7 is a flow chart showing the steps for detecting rotor position in a motor according to still another aspect of the present invention.

FIG. 7 is a flow chart showing the method steps carried out with the components shown in FIG. 2. Here, scanned signals or noise provided by a tone generator is injected into one of the de-energized stator phases of a motor in step 62. In step 64, a directional coupler is used to sample power reflected from the motor, which was directed to a digitizer for signal processing. In step 66, a digitizer provides the processed data to a processor, which computes a Fast Fourier Transform (FFT) of the reflected noise and generates a crude S11 plot. An empirically-derived frequency range was found for the FFT in step 68. Preferably, an $S_{11}$ plot having good structure and uniqueness across the range of motor positions is generated. In step 70, a neural-network is developed to interpret the FFT output and, in step 72, the FFT output is compared with data from known motor positions using conventional supervised learning methods.

In another aspect of the present invention, the $S_{11}$ plot can be used, not as a proxy for the absolute rotor position, but instead, can be used to determine incremental rotor positions such that changes in the $S_{11}$ plot can be used as an indicator of velocity. This is analogous to the difference between an absolute and an incremental rotary encoder.

Using this latter (incremental) method, the need to train the neural network for each model of motor would go away, and the velocity sensing capability would be more robust than the position sensing capability. This is because the changes in the $S_{11}$ plot from moment to moment would depend on the motor's basic configuration, (e.g., number of poles vs. number of magnets) much more than the particulars of the way a specific model of motor is designed or the wires (transmission line) leading from the motor to the $S_{11}$ sensing circuit.

The change in the algorithm involves taking the difference between each successive $S_{11}$ plot measurement and doing the neural network training on the difference plots instead of the absolute plots. In this aspect, absolute position information is not lost, even while determining incremental position.

The precise architecture of the $S_{11}$ sensing circuit can be based strictly on the ease of construction of the overall device. Thus, a working device can be built with readily available components and without custom component manufacture. A host of potentially superior methods of detecting $S_{11}$ are known in the art and it is conceivable that any such methods, which are commonly deployed in commercial test equipment, can be used in the present invention.

Cost and robustness could also be improved significantly by developing a version of the device which integrates all components onto a single board, and potentially onto a single integrated circuit. Especially, it may be an unnecessary complication to sample a continuous spectrum of reflected power. A series of discrete tones (bins) may be injected into the motor under test and similarly sampled with an analogue circuit, avoiding possible complexity of the noise-source-with-digitizer.

It is also conceivable that any conventional electric motor will have its own unique relationship between rotor position and reflected power, so that a particular model of motor would need to undergo a supervised learning regimen, the result of which might be implemented in firmware on deployed products.

As a result of the present invention, a method for detecting a rotor position of a motionless motor is provided. Previously, known sensorless brushless motor control techniques depended in some way on sensing the back EMF, which requires that the motor be in motion. By using the $S_{11}$ parameter as a proxy for position, the requirement that the motor be in motion for position sensing to work is eliminated.

Thus, a device using reflective-sensing as disclosed herein may be capable of detecting the position of a motor or generator without the motor or generator having a position sensor present on-board. The detection may occur even if the motor or generator is not moving or if they are moving slowly. The present device is a piece of hardware that attaches to a motor's or generator's pre-existing power wires, injects white noise into the motor or generator, and analyzes what gets reflected back from inside the motor or generator. This data may be referred to as the reflective sensing data.

Figure 8:
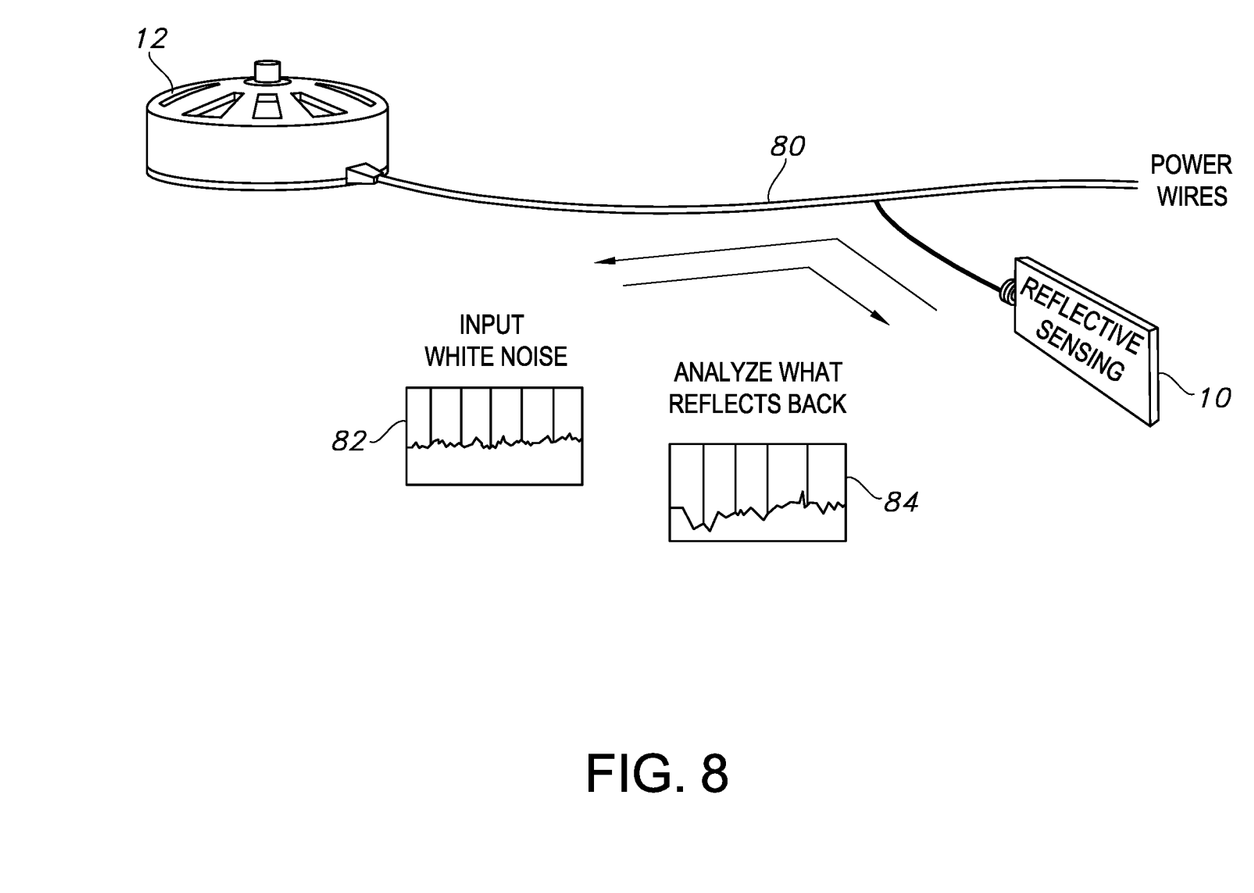
FIG. 8 shows physical electrical hardware that connects over pre-existing power wires and detects position or condition.

FIG. 8 shows a device 10 of the present invention having physical electrical hardware that connects over pre-existing power wires 80 for detecting the position of a rotor in a motor 12. As will be discussed further below, the device 10 is also capable of obtaining a status condition of the motor 12. Reflective sensing is a way of detecting the position of a motor accurately without there being an on-board sensor even if the motor isn't moving. The device 10 is shown as a piece of hardware that attaches to a motor's pre-existing power wires 80, injects white noise 82 into the motor, and analyzes data 84 that gets reflected back from inside the motor 12.

Figure 9:
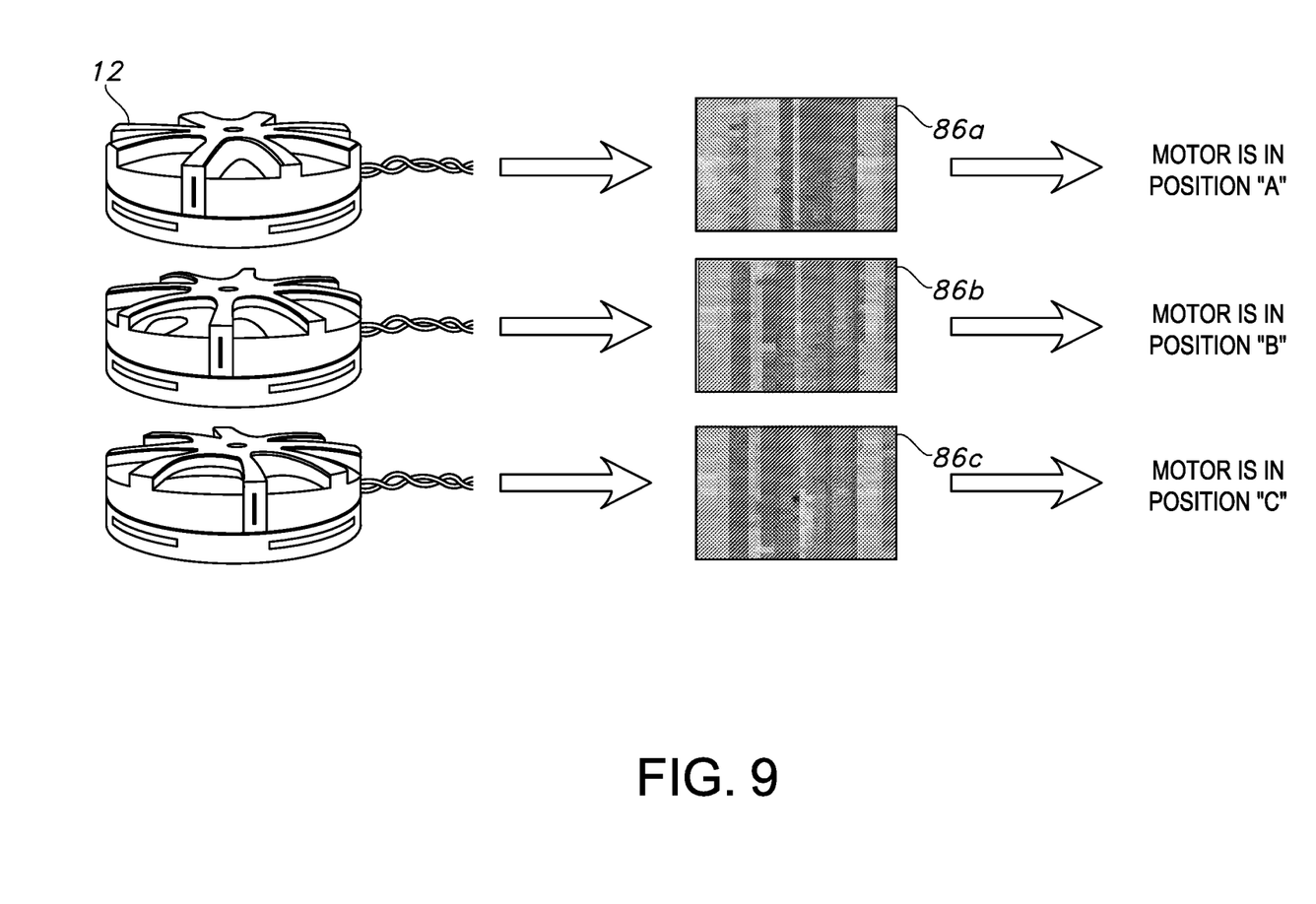
FIG. 9 shows a snapshot of a motor's total electrodynamic state, which among other things depends on the motor's position.

FIG. 9 diagrammatically illustrates a snapshot of a total electrodynamic state of a motor, which, among other things, depends on the position of the rotor within the motor. For each position of the motor 12, it can be seen that there is a unique snapshot of reflective sensing data 86a, 86b, 86c, corresponding to each motor position. This data snapshot 86a, 86b, 86c can be used to determine the motor's position without it having to be in motion and without adding components or anything to the motor.

Unlike conventional encoders, the device 10 of the present invention is suitable for use in harsh environments and, unlike currently available sensorless technology, it may work at low or zero speed. In addition, being "sensorless" itself, the mechanical footprint is low and it may be less costly than a similarly precise optical encoder.

Position sensing according to the present invention, where reflective sensing may provide an alternative to traditional position sensors for closed loop applications that works at arbitrarily low speeds or zero speed, may be viable or suited to harsh environments, may have a non-existent or small mechanical footprint on the motor, and can be hooked up or retrofitted to a motor or generator relatively easily.

Figure 10:
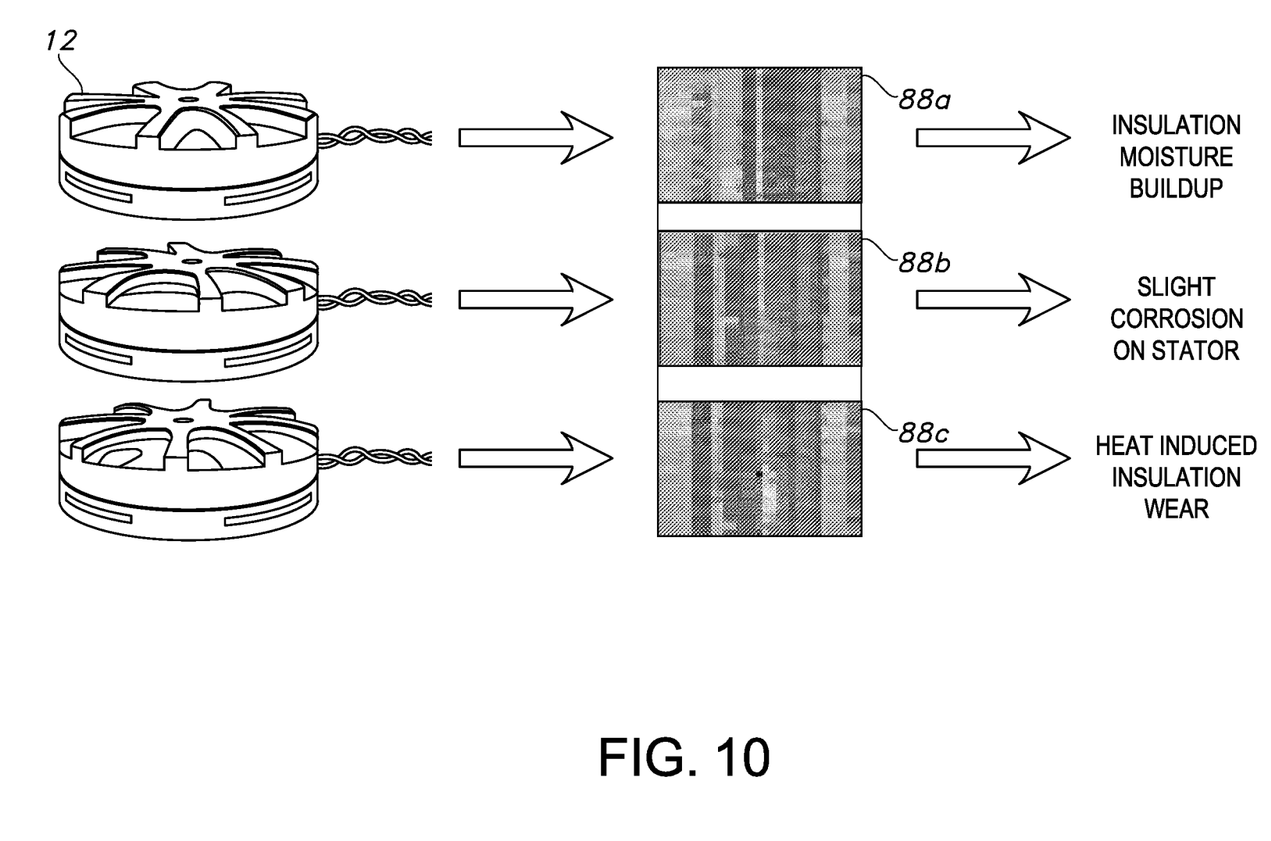
FIG. 10 shows reflective sensing data is providing a complete or total picture of the environment (what is happening) inside the motor or generator.

FIG. 10 shows reflective sensing of data, according to another embodiment of the present invention, wherein data providing a complete or total picture of the environment (what is happening) inside the motor or generator is gathered. For example, data images 88a, 88b, 88c representing respective fingerprints of the unique interaction of the internal wires with the magnets, the spacing of the magnets, the insulation thickness of the windings, and what makes a particular motor or generator what it is. This data can be used to determine a particular condition of the motor, (e.g., insulation moisture buildup, slight corrosion on stator, heat-induced insulation wear). Therefore, this technology could be used for more than position sensing.

In particular, as scattering parameter data from a motor is able to be interpreted by an analysis algorithm (namely a neural network) in order to infer position information about the motor, it is as well possible to make inferences about parameters relating to a motor or generator's condition. These parameters may include but are not limited to the thickness of internal winding insulation, moisture content of internal winding insulation, magnetic permeability of structural and magnetic components, presence of corrosion on structural and magnetic components, and variations in magnet or stator pole spacing. As well, neural network analysis could be directed to obtain warning of a motor or generator failure in a more general sense without considering specifically identified performance parameters.

The value proposition of condition monitoring provided by the present invention may be prolific in many sectors, especially where downtime may have unacceptable consequences (e.g., commercial wind turbines). Wind turbines have a high failure rate and may fail catastrophically. These systems may use condition monitoring for failure prediction such as thinning insulation in a generator or a motor's windings or internal corrosion or moisture.

A device is disclosed herein that may be a sensorless alternative to position sensors for closed loop applications that may provide position detection at arbitrarily low speeds, capable of performing in harsh environments, has a non-existent mechanical footprint on the motor, and may be hooked up to a motor or generator with relative ease (i.e., it may be retrofit-friendly). The present device may be useful with encoders, an example of a sensor in robotic applications.

Reflective sensing data may provide a complete or a more complete picture of the environment inside the motor or generator. This means that these snapshots or images may represent a fingerprint of one or more unique interaction(s) of the internal wires with the magnets, the spacing of the magnets, the insulation thickness of the windings, and other parameters that contribute to making a particular motor or generator what it is.

This means that the present reflective sensing technology can be used for position sensing and other applications, for example, condition monitoring (motor or generator health or performance monitoring for failure prediction). Condition monitoring may apply to many sectors, for example, sectors where downtime is an unacceptable consequence. One example of this may be commercial wind turbines as they may have a high failure rate with failures of varying degrees. The present reflective sensing may also be used to detect thinning insulation in a generator's or motor's windings, internal corrosion or moisture.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

All documents, patents and other literature referred to herein are incorporated by reference in their entirety. The term "comprising" as may be used in the following claims is an open-ended transitional term that is intended to include additional elements not specifically recited in the claims. The term "consisting essentially of" as may be used in the following claims is a partially closed transitional phrase and is intended to include the recited elements plus any unspecified elements that do not materially affect the basic and novel characteristics of the claims.

It should be noted that it is envisioned that any feature, element or limitation that is positively identified in this document may also be specifically excluded as a feature, element or limitation of an embodiment of the present invention.

The invention claimed is:

1. A method for determining the position of a rotor in a brushless motor, the method comprising:
   injecting electrical signals into a stator of the brushless motor;
   measuring scattering parameters reflected back from the stator, wherein the scattering parameters are influenced by the near-field dynamics imparted by the motor; and
   comparing the measured scattering parameters to a predetermined data set of scattering parameters for known rotor positions to determine the position of the rotor.

2. The method as defined in claim 1, wherein the predetermined data set of scattering parameters comprises a library of plots of scattering parameters over a predetermined frequency range, and wherein the step of comparing the measured scattering parameters comprises:
   generating a plot of the measured scattering parameters over a predetermined frequency range; and
   matching the generated plot with one of the plots in the library to determine the position of the rotor.

3. The method as defined in claim 1, wherein the electrical signals are injected using a scanning procedure, wherein discrete frequencies are introduced consecutively.

4. The method as defined in claim 1, wherein a predetermined range of frequencies of the electrical signals are injected simultaneously as noise.

5. The method as defined in claim 1, wherein the determined position of the rotor is an absolute position valve.

6. The method as defined in claim 1, wherein the determined position of the rotor is an incremental position value.

7. The method as defined in claim 1, wherein the predetermined data set of scattering parameters for known rotor positions is generated by a method comprising:
   setting the rotor of the motor to a first selected rotational position;
   injecting electrical signals into the stator of the motor with the rotor in the first selected position;
   measuring first scattering parameters reflected back from the stator with the rotor in the first selected position;
   generating a first plot of the measured first scattering parameters over a predetermined frequency range;
   storing the first plot of the measured first scattering parameters for the first selected rotational position in the predetermined data set;
   setting the rotor of the motor to a second selected rotational position;
   injecting electrical signals into the stator of the motor with the rotor in the second selected position;
   measuring second scattering parameters reflected from the stator with the rotor in the second selected position;
   generating a second plot of the measured second scattering parameters over a predetermined frequency range for the second selected position; and
   storing the second plot of the measured second scattering parameters for the second selected rotational position in the predetermined data set.

8. A device for determining the position of a rotor in a brushless motor, the device comprising:
   a source electrically connected to a stator of the brushless motor for injecting electrical signals into the stator; and
   a meter electrically connected to the stator for measuring scattering parameters reflected back from the stator and for comparing the measured scattering parameters to a predetermined data set of scattering parameters for known rotor positions to determine the position of the rotor.

9. The device as defined in claim 8, wherein the meter comprises a directional coupler electrically connected between the source and the stator of the motor.

10. The device as defined in claim 8, wherein the meter comprises:
    a digitizer for measuring the scattering parameters; and
    a processor for computing a Fast Fourier Transform (FFT) based on data recorded from the digitizer.

11. The device as defined in claim 10, wherein the processor comprises a neural network for generation that predetermined data set and for interpreting that measured scattering parameters.

12. A device for determining the condition of a generator or a motor, the device comprising:
    a source electrically connected to the generator or the motor for injecting electrical signals into the generator or the motor;
    a meter electrically connected to the generator or the motor for measuring scattering parameters or performance parameters reflected back from the generator or the motor and for comparing the measured scattering parameters or the measured performance parameters to a predetermined data set of scattering parameters or a predetermined data set of performance parameters to determine the condition of the generator or the motor;
    a digitizer for measuring the scattering parameters or the performance parameters; and
    a processor for computing analysis based on data recorded from the digitizer, wherein the processor comprises at least one neural network for generation of the predetermined data sets, for interpreting the measured scattering parameters or the measured performance parameters and for inferring information about the condition of the motor or the generator.

13. The device of claim 12 wherein the performance parameters are thickness of internal winding insulation, moisture content of internal winding insulation, magnetic permeability of structural and magnetic components, presence of corrosion on structural and magnetic components, or variations in magnet or stator pole spacing.

14. The device of claim 12 wherein the computing analysis further comprises a neural network analysis directed to warn or obtain warning of a motor or generator failure without specifically identified performance parameters.

* * * * *